United States Patent
Kubota et al.

(10) Patent No.: US 7,169,856 B2
(45) Date of Patent: Jan. 30, 2007

(54) VULCANIZABLE ACRYLIC RUBBER COMPOSITION AND VULCANIZATE

(75) Inventors: Isao Kubota, Tokyo (JP); Yoshiaki Aimura, Tokyo (JP); Kiyonori Umetsu, Tokyo (JP)

(73) Assignee: Zeon Corporation, Tokyo (JP)

( * ) Notice: Subject to any disclaimer, the term of this patent is extended or adjusted under 35 U.S.C. 154(b) by 142 days.

(21) Appl. No.: 10/502,958

(22) PCT Filed: Jan. 30, 2003

(86) PCT No.: PCT/JP03/00932

§ 371 (c)(1),
(2), (4) Date: Sep. 28, 2004

(87) PCT Pub. No.: WO03/064525

PCT Pub. Date: Aug. 7, 2003

(65) Prior Publication Data

US 2005/0080173 A1   Apr. 14, 2005

(30) Foreign Application Priority Data

Jan. 30, 2002  (JP)  ............................ 2002-021913

(51) Int. Cl.
*C08C 19/22*  (2006.01)

(52) U.S. Cl. ...................... 525/374; 525/379; 525/381; 525/329.7; 526/317.1; 526/318; 526/318.2

(58) Field of Classification Search ............. 625/329.7, 625/381, 379, 374; 526/317.1, 318, 318.2; 525/329.7, 381, 379, 374
See application file for complete search history.

(56) References Cited

U.S. PATENT DOCUMENTS 3,883,472 A * 5/1975 Greene et al. ............... 524/151
6,156,849 A    12/2000 Moriyama et al.

FOREIGN PATENT DOCUMENTS

| EP | 0 943 657 A2 | 9/1999 |
|----|--------------|--------|
| EP | 1 110 980 A1 * | 6/2001 |
| EP | 1 110 980 A1 | 6/2001 |
| EP | 1 378 539 A1 | 1/2004 |
| JP | 11-269336 A | 10/1999 |
| JP | 2001-181356 * | 7/2001 |
| JP | 2001-181356 A1 | 7/2001 |
| JP | 2002-265737 A | 9/2002 |

* cited by examiner

*Primary Examiner*—Ling-Sui Choi
(74) *Attorney, Agent, or Firm*—Birch, Stewart Kolasch & Birch, LLP

(57) ABSTRACT

A vulcanizable acrylic rubber composition comprising (A) 100 weight parts of an acrylic rubber comprising units of an acrylic acid ester monomer (a) and units of a carboxyl group-containing ethylenically unsaturated monomer (b), (B) 0.05–5 weight parts of a primary polyamine vulcanizer, and (C) 0.5–5.5 weight parts of at least one aliphatic monoamine compound selected from aliphatic secondary monoamine compounds (C-1) and aliphatic tertiary monoamine compounds (C-2); wherein the sum in amount of the monomer (a) units plus the monomer (b) units in the acrylic rubber (A) is at least 80% by weight based on the total monomer units, and the ratio in amount of the monomer (a) units to the sum of the monomer (a) units plus the monomer (b) units is 90–99.9 weight %. This vulcanizable acrylic rubber composition is not liable to easily stick to a metal surface and has good scorch resistance, and gives a vulcanizate having good oil resistance and metal corrosion resistance.

13 Claims, No Drawings

VULCANIZABLE ACRYLIC RUBBER COMPOSITION AND VULCANIZATE

TECHNICAL FIELD

This invention relates to a vulcanizable acrylic rubber composition exhibiting a reduced stickiness to a metal surface and a reduced tendency of scorching, and to a vulcanizate, made from the acrylic rubber composition, having good resistance to metal-corrosion and good oil resistance.

BACKGROUND ART

Acrylic rubbers have good cold resistance and good oil resistance, and therefore, are widely used as rubber parts, which are placed in contact with a metal element or oil, such as a sealing material, a hose material, a vibration insulator, a tubular material, a belt material and a boot material. It is desired that the acrylic rubbers have a reduced permanent set as well as good heat resistance and cold resistance. Further, it is desired to impart to the acrylic rubbers excellent resistance to metal corrosion and oil resistance as well as the above-mentioned properties.

Acrylic rubbers have a problem such that they have a short scorch time and are readily subject to scorch. There is an increasing demand for extending the scorch time and reducing the tendency of scorching.

Further, when unvulcanized acrylic rubbers are kneaded, they readily stick to a metal surface inside a kneader such as a Banbury mixer or a roll mill. Therefore, cleaning of a kneader is indispensable after kneading is conducted. It is requested to reduce the stickiness of acrylic rubbers to a metal surface.

As an acrylic rubber material exhibiting a long scorch time, an ethylene-acrylic acid ester-butenedioic acid monoester copolymer has been proposed in Japanese Unexamined Patent Publication (hereinafter abbreviated to as "JP-A") No. S50-45031. However, this acrylic rubber material is said to have poor oil resistance (JP-A H11-92614).

As a vulcanizate exhibiting good resistance to metal corrosion and having good oil resistance, a vulcanizate made from a vulcanizable rubber composition comprising an acrylic rubber having copolymerized with a fumaric acid mono-lower alkyl ester, an aromatic diamine vulcanizer and a guanidine vulcanization accelerator has been proposed in JP-A H11-92614. This vulcanizable acrylic rubber composition has a reduced tendency of scorching, but tends to exhibit stickiness to a metal surface.

To reduce the stickiness of an acrylic rubber to a metal surface, it is adopted to add an internal release agent such as an ester-type wax, a paraffin wax, a metal salt of an organic carboxylic acid, or silicone oil, in an acrylic rubber. However, a vulcanizate, made from the acrylic rubber having added thereto the internal release agent, has undesirably large permanent set and poor physical properties.

DISCLOSURE OF THE INVENTION

An object of the present invention is to provide a vulcanizable acrylic rubber composition having good kneadability and exhibiting a reduced tendency of scorching at a vulcanization step, and giving a vulcanizate having good metal-corrosion resistance and good oil resistance.

The inventors made an extensive research to achieve the above-mentioned object, and found that a vulcanizable acrylic rubber composition comprising an acrylic rubber having a specific composition, a specific vulcanizing agent and a specific vulcanization accelerator exhibits a reduced stickiness to a metal surface and a reduced tendency of scorching at a vulcanization step. The inventors further found that a vulcanizate made from the vulcanizable acrylic rubber composition has mechanical strength, heat resistance, cold resistance and permanent set, which are approximately the same level as or better than those of the conventional acrylic rubber vulcanizates, and metal-corrosion resistance and oil resistance, which are much better than those of the conventional acrylic rubber vulcanizates. The present invention has been completed on the basis of these findings.

Thus, in accordance with the present invention, there is provided a vulcanizable acrylic rubber composition comprising:

(A) 100 parts by weight of an acrylic rubber comprising units of an acrylic acid ester monomer (a) and units of a carboxyl group-containing ethylenically unsaturated monomer (b), (B) 0.05 to 5 parts by weight of a primary polyamine vulcanizing agent, and (C) 0.5 to 5.5 parts by weight of at least one kind of an aliphatic monoamine compound selected from aliphatic secondary monoamine compounds (C-1) and aliphatic tertiary monoamine compounds (C-2);

wherein the sum in amount of the monomer (a) units plus the monomer (b) units in the acrylic rubber (A) is at least 80% by weight based on the weight of the total monomer units, and the ratio in amount of the monomer (a) units to the sum of the monomer (a) units plus the monomer (b) units is in the range of 90 to 99.9% by weight.

In accordance with he present invention, there is further provided a vulcanizate made by vulcanizing the above-mentioned vulcanizable acrylic rubber composition.

BEST MODE FOR CARRYING OUT THE INVENTION

The vulcanizable acrylic rubber composition of the present invention comprises (A) 100 parts by weight of an acrylic rubber comprising units of an acrylic acid ester monomer (a) and units of a carboxyl group-containing ethylenically unsaturated monomer (b), (B) 0.05 to 5 parts by weight of a primary polyamine vulcanizing agent, and (C) 0.5 to 5.5 parts by weight of at least one kind of an aliphatic monoamine compound selected from aliphatic secondary monoamine compounds (C-1) and aliphatic tertiary monoamine compounds (C-2).

The acrylic rubber (A) as used herein comprises as the principle units acrylic acid ester monomer (a) units and carboxyl group-containing ethylenically unsaturated monomer (b) units. The sum in amount of the principal units, i.e., monomer (a) units plus monomer (b) units, is at least 80% by weight based on the weight of the total monomer units, and the ratio in amount of the monomer (a) units to the sum of the principal units (monomer (a) units plus monomer (b) units) is in the range of 90 to 99.9% by weight.

The acrylic rubber (A) contains a carboxyl group, and the amount of the carboxyl group is preferably in the range of $5 \times 10^{-4}$ to $4 \times 10^{-1}$ ephr, more preferably $2 \times 10^{-3}$ to $2 \times 10^{-1}$ ephr and especially preferably $4 \times 10^{-3}$ to $1 \times 10^{-1}$ ephr. If the content of carboxyl group in the acrylic rubber (A) is too small, the vulcanizability is insufficient and the vulcanizate is liable to have poor form-stability. In contrast, when the content of carboxyl group is too large, the vulcanizate tends to be hard and lose rubber elasticity.

The acrylic acid ester monomer (a) is preferably comprised of either an alkyl acrylate monomer alone, or a combination of an alkoxyalkyl acrylate monomer with an alkyl acrylate monomer. The latter combination of monomers is especially preferable.

The alkyl acrylate monomer preferably has 1 to 8 carbon atoms in the alkyl group, and, as specific examples thereof, there can be mentioned methyl acrylate, ethyl acrylate, n-propyl acrylate, n-butyl acrylate, isopropyl acrylate, isobutyl acrylate, n-hexyl acrylate, 2-ethylhexyl acrylate and cyclohexyl acrylate. Of these, ethyl acrylate and n-butyl acrylate are especially preferable.

The alkoxyalkyl acrylate monomer preferably has 2 to 8 carbon atoms in the alkoxyalkyl group, and, as specific examples thereof, there can be mentioned methoxymethyl acrylate, ethoxymethyl acrylate, 2-ethoxyethyl acrylate, 2-butoxyethyl acrylate, 2-methoxyethyl acrylate, 2-propoxyethyl acrylate, 3-methoxypropyl acrylate and 4-methoxybutyl acrylate. Of these, 2-ethoxyethyl acrylate and 2-methoxyethyl acrylate are especially preferable.

In the case when a combination of an alkyl acrylate monomer with an alkoxyalkyl acrylate monomer is used as the acrylic acid ester monomer (a), the combination is preferably comprised of 10 to 70% by weight of an alkoxyalkyl acrylate monomer, the alkoxyalkyl group of which has 2 to 8 carbon atoms, with 90 to 30% by weight of an alkyl acrylate monomer, the alkyl group of which has 1 to 8 carbon atoms. When the relative amount of alkyl acrylate monomer is too small, the tensile strength and elongation tend to be poor. In contrast, when the relative amount of alkyl acrylate monomer is too large, the cold resistance and heat resistance tend to be poor.

As specific examples of the carboxyl group-containing ethylenically unsaturated monomer (b), there can be mentioned monocarboxylic acids and polycarboxylic acids such as acrylic acid, methacrylic acid, ethacrylic acid, itaconic acid, maleic acid, fumaric aci and citraconic acid; and dicarboxylic acid monoalkyl esters having an ester group with an alkyl group having 1 to 8 carbon atoms such as monomethyl maleate, monoethyl maleate, mono-n-butyl maleate, monomethyl fumarate, monoethyl fumarate and mono-n-butyl fumarate. The carboxyl group may be a carboxylic anhydride group, and thus, carboxylic acid anhydride monomers such as maleic anhydride and citraconic anhydride may be used as the monomer (b). Of these monomers (b), monoethyl maleate, mono-n-butyl maleate, monoethyl fumarate and mono-n-butyl fumarate are preferable.

The sum in amount of the principal units (the monomer (a) units plus the monomer (b) units) in the acrylic rubber (A) is at least 80% by weight, preferably at least 90% by weight and more preferably at least 95% by weight, based on the weight of the total monomer units. If the sum in amount of the principal units is too small, a vulcanizate is liable to have poor rubbery characteristics such as poor rubber elasticity.

The ratio (a)/[(a)+(b)] in amount of the monomer (a) units to the sum of the monomer (a) units plus the monomer (b) units in the acrylic rubber (A) is in the range of 90 to 99.9% by weight, preferably 92 to 99.7% by weight and more preferably 94 to 99.5% by weight; and the ratio in amount of the monomer (b) units to the sum of the monomer (a) units plus the monomer (b) units in the range of 0.1 to 10% by weight, preferably 0.3 to 8% by weight and more preferably 0.5 to 6% by weight. If the ratio in amount of monomer (a) units to the sum of monomer (a) units plus monomer (b) units is too small, a vulcanizate has poor tenacity and elongation. In contrast, if the ratio in amount of (a)/[(a)+(b)] is too large, the vulcanizability tends to become poor.

The acrylic rubber (A) used in the present invention may comprise units of other copolymerizable monomer in addition to the principal units. The copolymerizable monomer includes, for example, a conjugated diene monomer, a non-conjugated diene monomer, an aromatic vinyl monomer, an $\alpha,\beta$-ethylenically unsaturated nitrile monomer, an amide group-containing acrylic or methacrylic monomer, a polyfunctional di-acrylic or di-methacrylic monomer and an aliphatic vinyl monomer. As specific examples of these copolymerizable monomers, there can be mentioned conjugated diene monomers such as 1,3-butadiene, 2-methyl-1,3-butadiene, chloroprene and piperylene; non-conjugated diene monomers such as 1,2-butadiene, 1,4-pentadiene, dicyclopentadiene, norbornene, ethylidene-norbornene, hexadiene and norbornadiene; aromatic vinyl monomers such as styrene, $\alpha$-methylstyrene and divinylbenzene; $\alpha,\beta$-ethylenically unsaturated nitrile monomers such as acrylonitrile and methacrylonitrile; amide group-containing acrylic or methacrylic monomers such as acrylamide and mehacrylamide; polyfunctional di-acrylic or di-methacrylic monomers such as ethylene glycol diacrylate, propylene glycol diacrylate, ethylene glycol dimethacrylate and propylene glycol dimethacrylate; and aliphatic vinyl monomers such as vinyl chloride, vinylidene chloride, vinyl acetate, ethyl vinyl ether and butyl vinyl ether.

The amount of these copolymerizable monomers is not larger than 20% by weight, preferably not larger than 10% by weight and more preferably not larger than 5% by weight, based on the total monomers.

The acrylic rubber (A) preferably has a Mooney viscosity ($ML_{1+4}$, 100° C.) in the range of 10 to 70, more preferably 20 to 60 and especially preferably 30 to 50. If the Mooney viscosity is too small, the shapability and processability of rubber composition, and the mechanical strength of vulcanizate are liable to be poor. In contrast, the Mooney viscosity is too large, the shapability and processability of rubber composition tend to become poor.

The primary polyamine vulcanizing agent (B) used in the present invention is a compound having two or more primary amino groups, or a salt thereof, and has a function of vulcanizing the acrylic rubber (A). The primary polyamine (B) is usually selected from aliphatic primary polyamine compounds, aromatic primary polyamine compounds, and salts thereof. Primary diamine compounds, primary triamine compounds, and salts thereof are preferable. Of these, primary diamine compounds and salts thereof are more preferable. Aliphatic primary diamine compounds, aromatic primary diamine compounds, and salts thereof are especially preferable. The primary polyamine vulcanizing agent (B) may be used as a combination of two or more thereof.

As specific examples of the primary polyamine vulcanizing agent (B), there can be mentioned aliphatic primary diamine compounds such as hexamethylenediamine, etylenediamine and cyclohexanediamine; salts of aliphatic primary diamine compounds such as hexamethylenediamine carbamate and ethylenediamine carbamate; aliphatic primary trimaine compounds such as bis(hexamethylene)triamine, 3,3'-diaminodipropylamine and cyclohexanetriamine; aromatic primary diamine compounds such as 4,4'-methylenedianiline, m-phenylenediamine, 4,4'-diaminodiphenyl ether, 3,4'-diaminodiphenyl ether, 4,4'-(m-phenylene-diisopropylidene)dianiline, 4,4'-(p-phenylene-diisopropylidene)dianiline, 2,2'-bis[4-(4-aminophenoxy)phenyl]propane, 4,4'-diaminobenzanilide and 4,4'-bis(4-aminophenoxy)biphenyl; and aromatic primary triamine compounds such as N,N',N"-triphenyl-1,3,5-benezenetri-amine. Of these, hexamethylenediamine carbamate, 4,4'-diaminodiphenyl ether, 4,4'-(m-phenylene-diisopropylidene)dianiline, 4,4'-(p-phenylene-diisopropylidene) dianiline and 2,2'-bis[4-(4-aminophenoxy)-phenyl]propane are especially preferable.

The amount of the primary polyamine vulcanizing agent (B) is in the range of 0.05 to 5 parts by weight, preferably 0.1 to 4 parts by weight and more preferably 0.2 to 3 parts by weight, based on 100 parts by weight of the acrylic rubber (A). If the amount of the primary polyamine vulcanizing agent (B) is too large, a vulcanizate is liable to be hard, have a small elongation, and exhibit a reduced elongation after imposition of heat load. In contrast, if the amount of the primary polyamine vulcanizing agent (B) is too small, a vulcanizate is liable to have greatly reduced strength and exhibit undesirably increased changes in elongation and tensile strength after imposition of heat load.

The aliphatic monoamine compound (C) used in the present invention is selected from aliphatic secondary monoamine compounds (C-1) and aliphatic tertiary monoamine compounds (C-2), and has a function of accelerating the vulcanization reaction of the acrylic rubber (A) caused by the primary polyamine vulcanizing agent (B).

The aliphatic secondary monoamine compound (C-1) is a compound prepared by substituting two hydrogen atoms of ammonia by aliphatic hydrocarbon groups, which preferably have 1 to 30 carbon atoms, more preferably 8 to 20 carbon atoms. As specific examples of the aliphatic secondary monoamine compound (C-1), there can be mentioned dimethylamine, diethylamine, dipropylamine, diallylamine, diisopropylamine, di-n-butylamine, di-t-butylamine, di-sec-butylamine, dihexylamine, dicyclohexylamine, diheptylamine, dioctylamine, dinonylamine, didecylamine, diundecylamine, didodecylamine, ditridecylamine, ditetradecylamine, dipentadecylamine, dicetylamine, di-2-ethylhexylamine, dioctadecylamine, di-cis-9-octadecenylamine and dinonadecylamine. Of these, dioctylamine, didecylamine, didodecylamine, ditetradecylamine, dicetylamine, dioctadecylamine, di-cis-9-octadecenylamine and dinonadecylamine are preferable.

The aliphatic tertiary monoamine compound (C-2) used in the present invention is a compound prepared by substituting all of the three hydrogen atoms of ammonia by aliphatic hydrocarbon groups, which preferably have 1 to 30 carbon atoms, more preferably 1 to 22 carbon atoms. As specific examples of the aliphatic tertiary monoamine compound (C-2), there can be mentioned trimethylamine, triethylamine, tripropylamine, triallylamine, triisopropylamine, tri-n-butylamine, tri-t-butylamine, tri-sec-butylamine, trihexylamine, triheptylamine, trioctylamine, trinonylamine, tridecylamine, triundecylamine, tridodecylamine, tritridecylamine, tritetradecylamine, tripentadecylamine, tricetylamine, tri-2-ethylhexylamine, trioctadecylamine, tri-cis-9-octadecenylamine, trinonadecylamine, N,N-dimethyldecylamine, N,N-dimethyldodecylamine, N,N-dimethyltetradecylamine, N,N-dimethylcetylamine, N,N-dimethyloctadecylamine, N,N-dimethylbehenylamine, N-methyldidecylamine, N-methyldidodecylamine, N-methylditetradecylamine, N-methyldicetylamine, N-methyldioctadecylamine, N-methyldibehenylamine and dimethylcyclohexylamine. Of these, N,N-dimethyldodecylamine, N,N-dimethyltetradecylamine, N,N-dimethylcetylamine, N,N-dimethyloctadecylamine and N,N-dimethylbehenylamine are preferable.

The aliphatic secondary monoamine compound (C-1) and the aliphatic tertiary monoamine compound (C-2) may be used as a combination of two or more thereof.

The amount of the aliphatic monoamine compound (C) is in the range of 0.5 to 5.5 parts by weight, preferably 1 to 5 parts by weight and more preferably 1.5 to 4.5 parts by weight, based on 100 parts by weight of the acrylic rubber (A). If the amount of the aliphatic monoamine compound (C) is too small, a vulcanizate is liable to have greatly reduced strength and large permanent set. In contrast, if the amount of the aliphatic monoamine compound (C) is too large, the aliphatic monoamine compound (C) is liable to bloom on the surface of a vulvanizate, and undesirably increase the change in hardness of a vulcanizate after imposition of heat load.

The vulcanizable acrylic rubber composition of the present invention may contain additives such as a reinforcing agent, a filler, an antioxidant, a light stabilizer, a plasticizer, a processing aid, a lubricant, a tackifier, a flame-retardant, a mildew-proofing agent, an antistatic agent and a colorant, according to the need.

The vulcanizable rubber composition may comprise other rubber in addition to the acrylic rubber (A), an elastomer and a resin, according to the need. More specifically, the vulcanizable rubber composition may comprise, for example, rubbers such as natural rubber, an acrylic rubber other than the acrylic rubber (A), a polybutadiene rubber, a polyisoprene rubber, a styrene-butadiene rubber and an acrylonitrile-butadiene rubber; elastomers such as an olefin elastomer, a styrene elastomer, a vinyl chloride elastomer, a polyester elastomer, a polyamide elastomer, a polyurethane elastomer and a polysiloxane elastomer; and resins such as a polyolefin resin, a polystyrene resin, a polyacrylic resin, a polyphenylene-ether resin, a polyester resin and a polycarbonate resin. The amount of these rubbers, elastomers and resins is preferably smaller than 50% by weight based on the weight of the acrylic rubber (A).

The method for preparing the vulcanizable acrylic rubber composition of the present invention is not particularly limited. The vulcanizable acrylic rubber composition can be prepared by the conventional methods widely adopted for the preparation of general vulcanizable rubber compositions. For example, an appropriate mixing procedure such as roll mixing, Banbury mixng, screw mixing and solution mixing can be adopted. The order in which the required ingredients are mixed together is not particularly limited, but, in a preferable procedure, ingredients which are incapable of being readily degraded by heat are mixed thoroughly, and then, ingredients which are readily reacted or degraded by heat, for example, a primary monomaine vulcanizing agent (B), is mixed together at a low temperature and in a short time so that the latter ingredients are incapable of being readily reacted or degraded.

The method of shaping the vulcanizable acrylic rubber composition is not particularly limited, and any shaping method such as, for example, compression molding, injection molding, transfer molding and extrusion shaping can be adopted. A suitable vulcanizing method may be chosen depending upon the intended shaped or other factors. Shaping and vulcanization can be carried out either simultaneously, or separately in the order of shaping and then vulcanization.

A vulcanizate of the present invention is made by heating the above-mentioned vulcainizable acrylic rubber composition. The heating temperature is in the range of 130° C. to 220° C., more preferably 140° C. to 200° C. The vulcanization time is preferably selected from the range of 30 seconds to 5 hours, depending upon the intended vulcanization density and the production efficiency. The heating procedure may appropriately be chosen from those which are adopted for the vulcanization of rubbers, such as press heating, steam heating, oven heating and hot-air heating.

After vulcanization is carried out once, after-vulcanization can be carried out for vulcanizing completely the central part of a vulcanizate. The after-vulcanization is conducted for a long period of time. The time for after-vulcanization varies depending upon the heating procedure, the vulcanization temperature and the shape of vulcanizate, but is preferably in the range of 1 to 48 hours. The heating temperature for after-vulcanization may appropriately be chosen.

The invention will now be described specifically by the following examples and comparative examples. % for the composition of monomer units in a rubber is by weight.

Characteristics of an acrylic rubber, a vulcanizable rubber composition and a vulcanizate were evaluated by the following methods.

(1) Mooney Viscosity of Acrylic Rubber

Mooney viscosity ($ML_{1+4}$) of an acrylic rubber was measured at a temperature of 100° C. according to JIS K6300.

(2) Scorch Resistance of Vulcanizable Rubber Composition

Scorch resistance of a vulcanizable rubber composition was expressed by a Mooney scorch time t5 (unit: minute) as measured at a temperature of 125° C. according to JIS K6300.

(3) Stickiness Resistance to Metal Surface of Vulcanizable Rubber Composition

Resistance to stickiness to a metal surface was evaluated as follows. A specimen of an unvulcanized vulcanizable acrylic rubber composition having a size of 1 cm×3 cm×0.8 cm was stuck onto a chromium-plated SUS plate, and pressed at a temperature of 70° C. for 5 minutes under a pressure of 3 MPa. Sticking stress (unit: kgf) required for releasing the specimen from the SUS plate was measured. The smaller the sticking stress, the smaller the stickiness to a metal surface.

(4) Oil Resistance of Vulcanizate

Oil resistance of a vulcanizate was evaluated by the change in volume (unit: %) as measured by conducting an immersion-in-oil test wherein a sample was immersed in a test oil "IRM903" at a temperature of 150° C. for 70 hours.

(5) Metal Corrosion Resistance of Vulcanizate

Metal corrosion resistance of a vulcanizate was evaluated as follows. Corrosion of a metal plate was tested using four kinds of test metal plates, i.e., zinc, copper, brass and SUS plates. A specimen of a vulcanizate was stuck on a metal plate, and left to stand at a temperature of 40° C. and a humidity of 80% for one week. The state of corrosion was observed and the metal corrosion resistance was evaluated by the following two ratings.

A: Corroded area is smaller than 10%.

B: Corroded area is 10% or larger.

As for the corrosion test of zinc plate and SUS plate, corrosion of these metal plates was not observed in the Examples and Comparative Examples, and therefore, the evaluation results are not shown in Table 1-2 and Table 2-2.

(6) Dry Physical Properties of Vulcanizate

Tensile strength (unit: MPa), elongation (unit: %) and hardness of a vulcanizate were measured according to JIS K6251.

(7) Heat Resistance of Vulcanizate

Heat resistance of a vulcanizate was evaluated by change (unit: %) of tensile strength, change (unit: %) of elongation and change of hardness of a vulcanizate as measured by conducting a hot-air aging test at a temperature of 175° C. for 70 hours according to JIS K6257.

(8) Cold Resistance of Vulcanizate

Cold resistance of a vulcanizate was expressed by Gehman Tio value (unit: ° C.) as measured by Gehman low-temperature tortion test according to JIS K6261.

(9) Permanent Set of Vulcanizate

Permanent set of a vulcanizate was measured as follows. An O-ring was compressed by 25%, and, when the compressed O-ring was left to stand at a temperature of 175° C. for 70 hours, the compression was released. When the compression-released O-ring was left to stand at a temperature of 23° C. and a humidity of 50% for 30 minutes, the permanent set (unit: %) was measured.

EXAMPLE 1

The following ingredients were kneaded together by a Banbury mixer at 50° C.

(i) 100 parts of acrylic rubber A1 [content of ethyl acrylate units: 47%, content of n-butyl acrylate units: 34%, content of 2-methoxyethyl acrylate: 14%, content of mono-n-butyl maleate units: 5% (content of acrylic acid ester monomer (a) units: 95%, content of carboxyl group-containing ethylenically unsaturated monomer (b) units: 5%, ratio of alkyl acrylate monomer units to acrylic acid ester monomer (a) units: 85.3%), content of carboxyl group: $8 \times 10^{-3}$ ephr, Mooney viscosity ($ML_{1+4}$, 100° C.): 35], (ii) 60 parts of carbon black (classified as "N550" according to ASTM D1765), (iii) 2 parts of stearic acid (dispersant for dispersing carbon black, and softener), and (iv) 2 parts of 4,4'-bis(α,α-dimethylbenzyl)diphenylamine (antioxidant).

To the thus-obtained mixture, the following ingredients were added and mixed together at 40° C. by an open roll mill to give a vulcanizable acrylic rubber composition.

(v) 0.6 part of 4,4'-diaminodiphenyl ether (vulcanizing agent, aromatic primary diamine), and (vi) 2 parts of didodecylamine (aliphatic secondary monoamine compound).

Using the above-mentioned vulcanizable acrylic rubber composition, Mooney scorch time was measured.

The above-mentioned vulcanizable acrylic rubber composition was pressed at a pressure of 10 MPa and a temperature of 170° C. for 20 minutes whereby vulcanization and shaping were simultaneously carried out to give a vulcanized test specimen having a size of 15 cm×15 cm×2 mm. The test specimen was left to stand at a temperature of 170° C. for 4 hours to conduct after-vulcanization. Using the thus-obtained test specimen, oil resistance, metal-corrosion resistance, tensile strength, elongation, hardness, heat resistance and cold resistance of vulcanzate were evaluated.

The above-mentioned vulcanizable acrylic rubber composition was pressed at a pressure of 10 MPa and a temperature of 170° C. for 20 minutes whereby vulcanization and shaping were simultaneously carried out, and then, the pressed specimen was left to stand at a temperature of 170° C. for 4 hours to conduct after-vulcanization to give an O-ring having a diameter of 3.1 mm. Using the -ring, permanent set of vulcanizate was measured.

The evaluation results are shown in Table 1-1 and Table 1-2.

EXAMPLE 2

By the same procedures as described in Example 1, a vulcanizable acrylic rubber composition and its vulcanizate were prepared and their characteristics were evaluated wherein the amount of didodecylamine was changed from 2 parts to 1 part with all other conditions remaining the same. The evaluation results are shown in Table 1-1 and Table 1-2.

EXAMPLE 3

By the same procedures as described in Example 1, a vulcanizable acrylic rubber composition and its vulcanizate were prepared and their characteristics were evaluated wherein the amount of didodecylamine was changed from 2 parts to 4 parts with all other conditions remaining the same. The evaluation results are shown in Table 1-1 and Table 1-2.

EXAMPLE 4

By the same procedures as described in Example 1, a vulcanizable acrylic rubber composition and its vulcanizate were prepared and their characteristics were evaluated wherein dioctadecylamine (aliphatic secondary monoamine compound) was used instead of didodecylamine with all other conditions remaining the same. The evaluation results are shown in Table 1-1 and Table 1-2.

EXAMPLE 5

By the same procedures as described in Example 1, a vulcanizable acrylic rubber composition and its vulcanizate were prepared and their characteristics were evaluated wherein 0.6 part of hexamethylenediamine carbamate (carbonic acid salt of aliphatic primary diamine compound) was used instead of 0.6 part of 4,4'-diaminodiphenyl ether, and the amount of didodecylamine was changed from 2 parts to 4 parts with all other conditions remaining the same. The evaluation results are shown in Table 1-1 and Table 1-2.

EXAMPLE 6

By the same procedures as described in Example 1, a vulcanizable acrylic rubber composition and its vulcanizate were prepared and their characteristics were evaluated wherein the amount of 4,4'-diaminodiphenyl ether was changed from 0.6 part to 0.3 part with all other conditions remaining the same. The evaluation results are shown in Table 1-1 and Table 1-2.

EXAMPLE 7

By the same procedures as described in Example 1, a vulcanizable acrylic rubber composition and its vulcanizate were prepared and their characteristics were evaluated wherein N,N-dimethyloctadecylamine (aliphatic tertiary monoamine compound) was used instead of didodecylamine with all other conditions remaining the same. The evaluation results are shown in Table 1-1 and Table 1-2.

EXAMPLE 8

By the same procedures as described in Example 1, a vulcanizable acrylic rubber composition and its vulcanizate were prepared and their characteristics were evaluated wherein acrylic rubber A2 [content of ethyl acrylate units: 49%, content of n-butyl acrylate units: 34%, content of 2-methoxyethyl acrylate: 14%, content of mono-n-butyl fumarate units: 3% (content of acrylic acid ester monomer (a) units: 97%, content of carboxyl group-containing ethylenically unsaturated monomer (b) units: 3%, ratio of alkyl acrylate monomer units to acrylic acid ester monomer (a) units: 85.6%), content of carboxyl group: $1.3 \times 10^{-2}$ ephr, Mooney viscosity ($ML_{1+4}$, 100° C.): 35] was used instead of acrylic rubber A1 with all other conditions remaining the same. The evaluation results are shown in Table 1-1 and Table 1-2.

EXAMPLE 9

By the same procedures as described in Example 1, a vulcanizable acrylic rubber composition and its vulcanizate were prepared and their characteristics were evaluated wherein acrylic rubber A2 was used instead of acrylic rubber A1, and 1 part of 4,4'-(p-phenylenediisopropylidene)dianiline (aromatic primary diamine compound) was used instead of 0.6 part of 4,4'-diaminodiphenyl ether with all other conditions remaining the same. The evaluation results are shown in Table 1-1 and Table 1-2.

EXAMPLE 10

By the same procedures as described in Example 1, a vulcanizable acrylic rubber composition and its vulcanizate were prepared and their characteristics were evaluated wherein acrylic rubber A2 was used instead of acrylic rubber A1, and 1 part of 2,2-bis[4-(4-aminophenoxy)phenyl]propane (aromatic primary diamine compound) was used instead of 0.6 part of 4,4'-diaminodiphenyl ether with all other conditions remaining the same. The evaluation results are shown in Table 1-1 and Table 1-2.

EXAMPLE 11

By the same procedures as described in Example 1, a vulcanizable acrylic rubber composition and its vulcanizate were prepared and their characteristics were evaluated wherein acrylic rubber A2 was used instead of acrylic rubber A1, and 2.5 parts of 2,2-bis[4-(4-aminophenoxy)phenyl]propane was used instead of 0.6 part of 4,4'-diaminodiphenyl ether with all other conditions remaining the same. The evaluation results are shown in Table 1-1 and Table 1-2.

COMPARATIVE EXAMPLE 1

By the same procedures as described in Example 1, a vulcanizable acrylic rubber composition and its vulcanizate were prepared and their characteristics were evaluated wherein the amount of didodecylamine was changed from 2 parts to 0.3 part with all other conditions remaining the same. The evaluation results are shown in Table 2-1 and Table 2-2.

COMPARATIVE EXAMPLE 2

By the same procedures as described in Example 1, a vulcanizable acrylic rubber composition and its vulcanizate were prepared and their characteristics were evaluated wherein the amount of didodecylamine was changed from 2 parts to 6 parts with all other conditions remaining the same. The evaluation results are shown in Table 2-1 and Table 2-2.

COMPARATIVE EXAMPLE 3

By the same procedures as described in Example 1, a vulcanizable acrylic rubber composition and its vulcanizate were prepared and their characteristics were evaluated wherein acrylic rubber A2 was used instead of acrylic rubber A1, and 1.2 parts of diphenylmethane-bis-(4,4'-carbamoyl-ε-caprolactam) (blocked isocyanate compound having a plurality of secondary amines and tertiary amines) was used instead of 0.6 part of 4,4'-diaminodiphenyl ether with all other conditions remaining the same. The evaluation results are shown in Table 2-1 and Table 2-2.

COMPARATIVE EXAMPLE 4

By the same procedures as described in Example 1, a vulcanizable acrylic rubber composition and its vulcanizate were prepared and their characteristics were evaluated wherein acrylic rubber A2 was used instead of acrylic rubber A1, and 6 parts of 2,2'-bis[4-(4-aminophenoxy)phenyl]propane (aromatic primary diamine compound) was used instead of 0.6 part of 4,4'-diaminodiphenyl ether with all other conditions remaining the same. The evaluation results are shown in Table 2-1 and Table 2-2.

COMPARATIVE EXAMPLE 5

By the same procedures as described in Example 1, a vulcanizable acrylic rubber composition and its vulcanizate were prepared and their characteristics were evaluated wherein acrylic rubber A2 was used instead of acrylic rubber A1, 1 part of 2,2'-bis[4-(4-aminophenoxy)phenyl]propane was used instead of 0.6 part of 4,4'-diaminodiphenyl ether, and 2 parts of di-o-tolylguanidine was used instead of 0.3 part of didodecylamine with all other conditions remaining the same. The evaluation results are shown in Table 2-1 and Table 2-2.

COMPARATIVE EXAMPLE 6

By the same procedures as described in Example 1, a vulcanizable acrylic rubber composition and its vulcanizate were prepared and their characteristics were evaluated wherein acrylic rubber A2 was used instead of acrylic rubber A1, 1 part of 2,2'-bis[4-(4-aminophenoxy)phenyl]propane was used instead of 0.6 part of 4,4'-diaminodiphenyl ether, and 2 parts of N-cyclohexyl-2-benzothiazolylsulfenamide (non-aliphatic compound having secondary amine) was used instead of 0.3 part of didodecylamine with all other conditions remaining the same. The evaluation results are shown in Table 2-1 and Table 2-2.

COMPARATIVE EXAMPLE 7

By the same procedures as described in Example 1, a vulcanizable acrylic rubber composition and its vulcanizate were prepared and their characteristics were evaluated wherein acrylic rubber A2 was used instead of acrylic rubber A1, 1 part of 2,2'-bis[4-(4-aminophenoxy)phenyl]propane was used instead of 0.6 part of 4,4'-diaminodiphenyl ether, and 2 parts of 2-methylimidazole (non-aliphatic compound having tertiary amine) was used instead of 0.3 part of didodecylamine with all other conditions remaining the same. The evaluation results are shown in Table 2-1 and Table 2-2.

COMPARATIVE EXAMPLE 8

By the same procedures as described in Example 1, a vulcanizable acrylic rubber composition and its vulcanizate were prepared and their characteristics were evaluated wherein acrylic rubber a3 [content of ethyl acrylate units: 50%, content of n-butyl acrylate units: 28%, content of 2-methoxyethyl acrylate: 20%, content of vinyl chloroacetate units: 2% (content of monomer (b) units: 0%), Mooney viscosity ($ML_{1+4}$, 100° C.): 35] was used instead of acrylic rubber A1, 0.5 part of 2,4,6-trimercapto-s-triazine was used instead of 0.6 part of 4,4'-diaminodiphenyl ether, and 1.5 parts of zinc dibutyldithiocarbamate was used instead of 0.3 part of didodecylamine with all other conditions remaining the same. The evaluation results are shown in Table 2-1 and Table 2-2.

COMPARATIVE EXAMPLE 9

By the same procedures as described in Example 1, a vulcanizable acrylic rubber composition and its vulcanizate were prepared and their characteristics were evaluated wherein acrylic rubber a4 ("Vamac G" available from Du Pont Co., ethylene-acrylic acid ester-butenedioic acid monoester copolymer, content of ethylene units: at least 30%, Mooney viscosity ($ML_{1+4}$, 100° C.): 16) was used instead of acrylic rubber A1, the amount of 4,4'-diaminodiphenyl ether was changed from 0.6 part to 1.6 parts, and the amount of didodecylamine was changed from 2 parts to 4 parts with all other conditions remaining the same. The evaluation results are shown in Table 2-1 and Table 2-2.

TABLE 1-1

| | | | Examples | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Acrylic rubber | | | A1 | A1 | A1 | A1 | A1 | A1 | A1 | A2 | A2 | A2 | A2 |
| Total of (a) + (b) (%) *1 | | | 100 | 100 | 100 | 100 | 100 | 100 | 100 | 100 | 100 | 100 | 100 |
| (a)/[(a) + (b)] (%) *2 | | | 95 | 95 | 95 | 95 | 95 | 95 | 95 | 97 | 97 | 97 | 97 |
| Rubber composition (wt. parts) | | | | | | | | | | | | | |
| (A) | Acrylic rubber | | 100 | 100 | 100 | 100 | 100 | 100 | 100 | 100 | 100 | 100 | 100 |
| (B) | 4,4'-diaminodiphenyl ether | | 0.6 | 0.6 | 0.6 | 0.6 | — | 0.3 | 0.6 | 0.6 | — | — | — |
| | Hexamethylenediamine carbamate | | — | — | — | — | 0.6 | — | — | — | — | — | — |
| | 4,4'-(p-phenylene-diisopropylidene)dianiline | | — | — | — | — | — | — | — | — | 1 | — | — |
| | 2,2'-bis[4-(4-aminophenoxy)-phenyl]propane | | — | — | — | — | — | — | — | — | — | 1 | 2.5 |

TABLE 1-1-continued

|  |  | Examples | | | | | | | | | | |
| --- | --- | --- | --- | --- | --- | --- | --- | --- | --- | --- | --- | --- |
|  |  | 1 | 2 | 3 | 4 | 5 | 6 | 7 | 8 | 9 | 10 | 11 |
| (C-1) | Didodecylamine | 2 | 1 | 4 | — | 4 | 2 | — | 2 | 2 | 2 | 2 |
|  | Octadecylamine | — | — | — | 2 | — | — | — | — | — | — | — |
| (C-2) | N,N-dimethyldodecylamine | — | — | — | — | — | — | — | — | — | — | — |
|  | N,N-dimethyloctadecylamine | — | — | — | — | — | — | 2 | — | — | — | — |

Note,
*1 Total amount of monomer (a) units plus monomer (b) units
*2 Ratio in amount of monomer (a) units to the total of monomer (a) units plus monomer (b) units

TABLE 1-2

|  |  | Examples | | | | | | | | | | |
| --- | --- | --- | --- | --- | --- | --- | --- | --- | --- | --- | --- | --- |
|  |  | 1 | 2 | 3 | 4 | 5 | 6 | 7 | 8 | 9 | 10 | 11 |
| Properties of unvulcanized rubber composition |  |  |  |  |  |  |  |  |  |  |  |  |
| Sticking test - sticking stress | (kgf) | 0.85 | 0.98 | 0.42 | 0.88 | 0.39 | 0.83 | 0.90 | 0.86 | 0.84 | 0.87 | 0.85 |
| Mooney scorch time - t5 | (min) | 14.7 | 17.0 | 22.5 | 17.0 | 8.5 | 14.4 | 21.9 | 12.3 | 13.1 | 12.1 | 18.0 |
| Properties of vulcanizate |  |  |  |  |  |  |  |  |  |  |  |  |
| Test of immersion in oil - volume change | (%) | +18.6 | +18.4 | +19.2 | +19.4 | +18.7 | +19.8 | +19.1 | +18.8 | +18.2 | +18.5 | +18.3 |
| Metal corrosion (copper and brass) |  | A | A | A | A | A | A | A | A | A | A | A |
| Dry properties |  |  |  |  |  |  |  |  |  |  |  |  |
| Tensile strength | (MPa) | 9.9 | 9.4 | 9.1 | 9.4 | 10.2 | 8.3 | 9.0 | 9.8 | 10.1 | 9.6 | 10.6 |
| Elongation | (%) | 185 | 185 | 205 | 190 | 210 | 280 | 185 | 185 | 185 | 185 | 165 |
| Hardness |  | 63 | 63 | 61 | 64 | 62 | 60 | 66 | 64 | 62 | 61 | 65 |
| Hot-air aging |  |  |  |  |  |  |  |  |  |  |  |  |
| Change in tensile strength | (%) | −5 | −14 | +7 | −4 | −11 | −18 | −15 | −3 | −6 | −2 | −5 |
| Change in elongation | (%) | −3 | +5 | −7 | +0 | −2 | +11 | +16 | −3 | +0 | −5 | +0 |
| Change in hardness |  | +6 | +3 | +8 | +5 | +7 | +4 | +3 | +5 | +7 | +8 | +7 |
| Low temperature torsion test - Gehman $T_{10}$ value | (° C.) | −21.6 | −22.4 | −22.9 | −22.7 | −23.5 | −22.6 | −22.6 | −22.0 | −21.5 | −21.9 | −23.5 |
| Permanent set | (%) | 45.1 | 53.2 | 48.8 | 47.6 | 59.0 | 57.0 | 54.6 | 45.5 | 46.1 | 44.8 | 55.3 |

TABLE 2-1

|  |  | Comparative Examples | | | | | | | | |
| --- | --- | --- | --- | --- | --- | --- | --- | --- | --- | --- |
|  |  | 1 | 2 | 3 | 4 | 5 | 6 | 7 | 8 | 9 |
| Acrylic rubber |  | A1 | A1 | A2 | A2 | A2 | A2 | A2 | a3 | a4 |
| Total of (a) + (b) (%) *1 |  | 100 | 100 | 100 | 100 | 100 | 100 | 100 | 98 | Below 70 |
| (a)/[(a) + (b)] (%) *2 |  | 95 | 95 | 95 | 97 | 97 | 97 | 97 | 100 | Unidentified |
| Rubber composition (wt. parts) |  |  |  |  |  |  |  |  |  |  |
| (A) | Acrylic rubber A1 or A2 | 100 | 100 | 100 | 100 | 100 | 100 | 100 | — | — |
|  | Acrylic rubber a3 or a4 | — | — | — | — | — | — | — | 100 | 100 |
| (B) | 4,4'-diaminodiphenyl ether | 0.6 | 0.6 | — | — | — | — | — | — | 1.6 |
|  | 2,2'-bis[4-(4-aminophenoxy-phenyl]propane | — | — | — | 6 | 1 | 1 | 1 | — | — |
|  | Diphenylmethane-bis-(4,4'-carbamoyl-ϵ-caprolactam) | — | — | 1.2 | — | — | — | — | — | — |
| (C-1) | Didodecylamine | 0.3 | 6 | 2 | 2 | — | — | — | — | 4 |
|  | Di-o-tolylguanidine | — | — | — | — | 2 | — | — | — | — |
|  | N-cyclohexyl-2-benzothiazolyl sulfenamide | — | — | — | — | — | 2 | — | — | — |
|  | 2-Methylimidazole | — | — | — | — | — | — | 2 | — | — |

TABLE 2-1-continued

|  | Comparative Examples | | | | | | | | |
|---|---|---|---|---|---|---|---|---|---|
|  | 1 | 2 | 3 | 4 | 5 | 6 | 7 | 8 | 9 |
| 2,4,6-Trimercapto-s-triazine | — | — | — | — | — | — | — | 0.5 | — |
| Zinc dibutyldithiocarbamate | — | — | — | — | — | — | — | 1.5 | — |

Note,
*1 Total amount of monomer (a) units plus monomer (b) units
*2 Ratio in amount of monomer (a) units to the total of monomer (a) units plus monomer (b) units

TABLE 2-2

|  |  | Comparative Examples | | | | | | | | |
|---|---|---|---|---|---|---|---|---|---|---|
|  |  | 1 | 2 | 3 | 4 | 5 | 6 | 7 | 8 | 9 |
| Properties of unvulcanized rubber composition | | | | | | | | | | |
| Sticking test - sticking stress | (kgf) | 1.66 | 0.33 | 0.46 | 0.88 | 2.79 | 2.58 | 2.11 | 1.95 | 0.54 |
| Mooney scorch time - t5 | (min) | 46.9 | 41.0 | 18.8 | 32.7 | 9.1 | 77.5 | 4.8 | 8.3 | 18.2 |
| Properties of vulcanizate | | | | | | | | | | |
| Test of immersion in oil - volume change (%) | | +18.7 | +19.6 | +18.5 | +17.9 | +17.4 | +18.9 | +17.8 | +18.0 | +51.3 |
| Metal corrosion (copper and brass) | | A | A | A | A | A | A | A | B | A |
| Dry properties | | | | | | | | | | |
| Tensile strength | (MPa) | 9.2 | 8.2 | 9.2 | 7.3 | 10.0 | 9.1 | 10.5 | 10.1 | 16.2 |
| Elongation | (%) | 240 | 250 | 255 | 225 | 190 | 275 | 165 | 175 | 300 |
| Hardness | | 64 | 54 | 60 | 64 | 68 | 66 | 69 | 68 | 68 |
| Hot-air aging | | | | | | | | | | |
| Change in tensile strength | (%) | −46 | +13 | −13 | +27 | −9 | −26 | −14 | +1 | −7 |
| Change in elongation | (%) | +23 | −20 | −10 | −47 | +5 | +18 | +12 | +6 | −13 |
| Change in hardness | | +5 | +16 | +9 | +17 | +3 | +6 | +2 | +6 | +6 |
| Low temperature torsion test - Gehman $T_{10}$ value | (° C.) | −22.4 | −22.5 | −21.8 | −21.7 | −20.8 | −20.9 | −22.0 | −20.9 | −25.8 |
| Permanent set | (%) | 75.8 | 58.6 | 77.5 | 99.2 | 49.6 | 70.0 | 55.2 | 78.6 | 42.1 |

As seen from Tables 1-1 to 2-2, a vulcanizate made from a vulcanizable acrylic rubber composition comprising too small amount of an aliphatic secondary monoamine compound and/or an aliphatic tertiary monoamine compound exhibits a large permanent set (Comparative Example 1). In contrast, a vulcanizate made from a vulcanizable acrylic rubber composition comprising too large amount of an aliphatic secondary monoamine compound and/or an aliphatic tertiary monoamine compound exhibits a large change in hardness at a hot-air aging test (Comparative Example 2). A vulcanizate made from a vulcanizable acrylic rubber composition comprising a blocked isocyanate compound as a vulcanizing agent exhibits a large permanent set (Comparative Example 3). A vulcanizate made from a vulcanizable acrylic rubber composition comprising too large amount of an aromatic primary monoamine compound has poor heat resistance and exhibits a large permanent set (Comparative Example 4). A vulcanizable acrylic rubber composition comprising a guanidine compound as a vulcanizing agent is liable to easily stick to a metal surface (Comparative Example 5). A vulcanizable acrylic rubber composition comprising a sulfenamide compound as a vulcanizing agent is liable to easily stick to a metal surface, and a vulcanizate made therefrom exhibits a large permanent set (Comparative Example 6). A vulcanizable acrylic rubber composition comprising an imidazole compound as a vulcanizing agent has poor scorch resistance and is liable to easily stick to a metal surface (Comparative Example 7). A vulcanizable acrylic rubber composition containing a chlorine atom instead of a carboxyl group as a vulcanizing site is liable to easily stick to a metal surface, even when a vulcanizing agent is appropriately chosen, and a vulcanizate made therefrom exhibits a large permanent set and poor metal corrosion resistance (Comparative Example 8). A vulcanizate made from a vulcanizable rubber composition comprising an ethylene-acrylic acid ester-butenedioic acid monoester copolymer has poor heat resistance (Comparative Example 9).

In contrast to the above-mentioned comparative vulcanizable acrylic rubber composition, the vulcanizable acrylic rubber composition of the present invention is not liable to easily stick to a metal surface, and has good scorch resistance, and a vulcanizate made therefrom has good heat resistance, cold resistance, oil resisatnce and metal corrosion resistance (Examples 1 to 12).

In view of the beneficial characteristics, a vulcanizate made from the above-mentioned vulcanizable acrylic rubber composition can be widely used as, for example, a sealing material, a hose material, a vibration insulator, a tubular material, a belt material or a boot material.

The invention claimed is:
1. A vulcanizable acrylic rubber composition comprising:
(A) 100 parts by weight of an acrylic rubber comprising units of an acrylic acid ester monomer (a) and units of a carboxyl group-containing ethylenically unsaturated monomer (b),

(B) 0.05 to 5 parts by weight of a primary polyamine vulcanizing agent, and
(C) 0.5 to 5.5 parts by weight of at least one aliphatic monoamine compound selected from aliphatic secondary monoamine compounds (C-1);
wherein the sum in amount of the monomer (a) units plus the monomer (b) units in the acrylic rubber (A) is at least 80% by weight based on the weight of the total monomer units, and the ratio in amount of the monomer (a) units to the sum of the monomer (a) units plus the monomer (b) units is in the range of 90 to 99.9% by weight.

2. The vulcanizable acrylic rubber composition according to claim 1, wherein the acrylic rubber (A) contains a carboxyl group in an amount of $5 \times 10^{-4}$ to $4 \times 10^{-1}$ ephr.

3. The vulcanizable acrylic rubber composition according to claim 1, wherein the acrylic acid ester monomer (a) is comprised of either an alkyl acrylate monomer alone, the alkyl group of which has 1 to 8 carbon atoms, or a combination of an alkoxyalkyl acrylate monomer, the alkoxyalkyl group of which has 2 to 8 carbon atoms, with an alkyl acrylate monomer, the alkyl group of which has 1 to 8 carbon atoms.

4. The vulcanizable acrylic rubber composition according to claim 1, wherein the acrylic acid ester monomer (a) is comprised of a combination of 10 to 70% by weight of an alkoxyalkyl acrylate monomer, the alkoxyalkyl group of which has 2 to 8 carbon atoms, with 90 to 30% by weight of an alkyl acrylate monomer, the alkyl group of which has 1 to 8 carbon atoms.

5. The vulcanizable acrylic rubber composition according to claim 1, wherein the carboxyl group-containing ethylenically unsaturated monomer (b) is selected from monocarboxylic acids, polycarboxylic acids, and dicarboxylic acid monoalkyl esters having an ester group with an alkyl group having 1 to 8 carbon atoms.

6. The vulcanizable acrylic rubber composition according to claim 1, wherein the sum in amount of the monomer (a) units plus the monomer (b) units in the acrylic rubber (A) is at least 90% by weight based on the weight of the total monomer units.

7. The vulcanizable acrylic rubber composition according to claim 1, wherein the ratio in amount of the monomer (a) units to the sum of the monomer (a) units plus the monomer (b) units in the acrylic rubber (A) is in the range of 92 to 99.7% by weight.

8. The vulcanizable acrylic rubber composition according to claim 1, wherein the acrylic rubber (A) has a Mooney viscosity ($ML_{1+4}$, 100° C.) in the range of 10 to 70.

9. The vulcanizable acrylic rubber composition according to claim 1, wherein the primary polyamine vulcanizer (B) is selected from aliphatic primary polyamine compounds, aromatic primary polyamine compounds, and salts of these primary polyamine compounds.

10. The vulcanizable acrylic rubber composition according to claim 1, wherein the amount of the primary polyamine vulcanizer (B) is in the range of 0.1 to 4 parts by weight based on 100 parts by weight of the acrylic rubber (A).

11. The vulcanizable acrylic rubber composition according to claim 1, wherein the amount of the aliphatic monoamine compound (C) is in the range of 1 to 5 parts by weight based on 100 parts by weight of the acrylic rubber (A).

12. A vulcanizate made by vulcanizing the vulcanizable acrylic rubber composition as claimed in claim 1.

13. The vulcanizate according to claim 12, which is a sealing material, a hose material, a vibration insulator, a tubular material, a belt material or a boot material.

* * * * *